United States Patent
Bar-Shalom (10) Patent No.: US 7,350,481 B2
(45) Date of Patent: Apr. 1, 2008

(54) METHOD AND SYSTEM FOR MONITORING PHYSIOLOGICAL CONDITIONS OF, AND/OR SUITABILITY OF ANIMAL FEED FOR RUMINANT ANIMALS

(76) Inventor: Avshalom Bar-Shalom, Kibbutz Nachsolim, 30815 Doar Na Hacarmel (IL)

( * ) Notice: Subject to any disclaimer, the term of this patent is extended or adjusted under 35 U.S.C. 154(b) by 480 days.

(21) Appl. No.: 10/332,198

(22) PCT Filed: Jul. 18, 2001

(86) PCT No.: PCT/IL01/00659

§ 371 (c)(1),
(2), (4) Date: Jan. 7, 2003

(87) PCT Pub. No.: WO02/07644

PCT Pub. Date: Jan. 31, 2002

(65) Prior Publication Data

US 2003/0205208 A1    Nov. 6, 2003

(30) Foreign Application Priority Data

Jul. 19, 2000   (IL)   ........................... 137381

(51) Int. Cl.
*A01K 29/00*    (2006.01)
(52) U.S. Cl. .................................................. 119/859
(58) Field of Classification Search ............. 119/51.02, 119/719, 908, 174, 720, 721, 859; 340/573
See application file for complete search history.

(56) References Cited

U.S. PATENT DOCUMENTS

| | | | |
|---|---|---|---|
| 4,262,632 A * | 4/1981 | Hanton et al. ........... | 119/51.02 |
| 4,618,861 A * | 10/1986 | Gettens et al. ........... | 340/10.41 |
| 5,265,618 A * | 11/1993 | Zimmerman ................ | 600/531 |
| 5,503,112 A * | 4/1996 | Luhman et al. ............. | 119/174 |
| 5,900,818 A | 5/1999 | Lemnell | |
| 5,901,660 A * | 5/1999 | Stein ....................... | 119/51.02 |
| 6,202,596 B1 * | 3/2001 | Lopez et al. ................ | 119/174 |
| 6,474,263 B2 * | 11/2002 | Caja Lopez et al. ........ | 119/174 |
| 6,535,131 B1 * | 3/2003 | Bar-Shalom et al. .... | 340/573.1 |

FOREIGN PATENT DOCUMENTS

WO    00/13393    3/2000

* cited by examiner

Primary Examiner—Thomas Price (57) ABSTRACT

A method and system for monitoring the physiological condition, and/or suitability of animal feed, of ruminant animals, by: sensing actions of the animal indicating a ruminating activity; and accumulating the time of the ruminating activities over a predetermined time period to provide an indication of the physiological condition of the animal, and/or of desirable changes in its feed for maximizing milk production and/or for maintaining animal health. In one described preferred embodiment, the sensed actions of the animal are chewing actions produced by the animal while chewing animal feed according to a predetermined chewing rhythm indicating a ruminating activity as distinguished from an eating activity. In a second described embodiment, the sensed actions of the animal are regurgitations of a bolus from the animal's rumen to the animal's mouth sensed by a collar around the animal's neck.

9 Claims, 9 Drawing Sheets

METHOD AND SYSTEM FOR MONITORING PHYSIOLOGICAL CONDITIONS OF, AND/OR SUITABILITY OF ANIMAL FEED FOR RUMINANT ANIMALS

FIELD AND BACKGROUND OF THE INVENTION

The present invention relates to a method, and also to a system, for monitoring certain actions of ruminant animals in order to provide an indication of the physiological condition of the animal, a possible health problem in the animal, the suitability of the animal feed, and/or the suitability of the animal for continued milk production. The invention is particularly useful for monitoring dairy cattle to optimize the cattle feed for milk production and animal health, and the invention is therefore described below with respect to this application.

Ruminant animals, such as cattle, have a stomach divided into a plurality of chambers, the first of which is called the rumen. The animal ingests relatively large amounts of feed into the rumen with a minimum of chewing (a cud), before swallowing, periodically regurgitates a portion of the contents of the rumen (in the form of a bolus) back into the mouth, and further chews the regurgitated portion (bolus) before it is again swallowed and then directed to the other chambers of the stomach where it is further digested with the aid of various micro-organisms in the stomach.

It is well known that the content of the animal feed is an important factor in producing maximum milk production in milking cows, and optimum health in both milking cows and dry cows. Thus, fiber and roughage in the animal's diet stimulates fiber rumination, chewing, and saliva production, all necessary for maximum milk production in milking animals and optimum animal health. Inadequate fiber or roughage in the animal diet decreases chewing, rumination, and saliva such as to decrease milk production and to endanger animal health. Saliva produced by the animal during rumination introduces a bicarbonate which acts to buffer the rumen against acids. Sufficient rumination is also necessary to maintain a functional fiber mat in the rumen, which is important for the prevention of abomasal displacement, ketosis, retained placenta, and other diseases associated with low fiber/acidosis like laminitis, particularly in dry and postpartom cows. Therefore insufficient rumination may produce metabolic problems in the animal, such as acidosis, sore feet and off-feet problems; a decreased fat content of the milk; and/or an inadequate fiber mat in the rumen of dry animals for the prevention of abomasal displacement.

On the other hand, excessive fiber content or roughage in the animal feed limits the intake and digestibility, and therefore tends to reduce milk production.

In general, cows should be chewing their cuds about 50% of the time when not being fed or moved or milked, to produce adequate rumination activities. Also, a failure to chew for a continuous period of 2 or 3 hours would indicate a health problem.

OBJECTS AND BRIEF SUMMARY OF THE PRESENT INVENTION

According to one aspect of the present invention, there is provided a method of monitoring the suitability of animal feed, of ruminant animals, by: sensing actions of the animal indicating a ruminating activity; and accumulating in a data processor the time of the sensed actions indicating ruminating activity over a predetermined time period to provide an indication of desirable changes in the animal feed for maximizing milk production and/or for maintaining animal health.

In these described preferred embodiments, the sensor unit further includes a transmitter for transmitting, via a wireless link, the processed information to a remotely-located receiver. This information relating to specific animals, or to the herd in general, may be for statistical purposes, or for alerting the observer to a specific action that may be required with respect to changing the animal's feed, treating a health condition of the animal, or determining whether the animal is still suitable for milk production.

In some preferred embodiments of the invention described below, the sensed actions of the animal are chewing actions produced by the animal while chewing animal feed according to a predetermined rhythm indicating a ruminating activity as distinguished from an eating activity. In the described preferred embodiments, the chewing actions are chewing sounds sensed by a sound sensor carried by the animal's neck.

Further embodiments of the invention are described below, wherein the sensed actions of the animal are regurgitations of a bolus from the animal's rumen to the animal's mouth. In one described preferred embodiment, the regurgitations are sensed by a sound sensor carried around the animal's neck. In another embodiment, the regurgitations are sensed by a first bolus sensor carried by the animal's throat close to the mouth, and a second bolus sensor carried by the animal's throat spaced from the first sensor a predetermined distance in the direction of the animal's stomach, a regurgitation being indicated when the first bolus sensor senses a bolus within a predetermined time interval after a bolus is sensed by the second bolus sensor.

According to another aspect of the present invention, there is provided a system for monitoring the suitability of animal feed, of ruminant animals, comprising: at least one sensor for sensing actions of the animal indicating a ruminating activity; and a data processor for accumulating the time of the sensed actions indicating ruminating activities over a predetermined time period to provide an indication of desirable changes in the animal feed for maximizing milk production and/or maintaining animal health.

The sensors for sensing chewing actions are preferably sound sensors, and those for sensing regurgitations are preferably microswitches. However, other types of sensors could be used. For example, chewing actions could be sensed by sensors for sensing the motions of the animal's lower jaw, or the tightening of the animal's muscles in the throat when swallowing. Regurgitations could also be sensed by sound sensors.

The invention of the present application, relating to sensing, and accumulating the time of, ruminating activities to provide an indication of the physiological condition of the animal, and/or the desirability of changes in its feed, is to be distinguished from the system described in our prior PCT Application PCT/IL99/00452, International Publication WO 00/13393, published Mar. 9, 2000, which included a sound sensor attached to the neck of an animal for detecting and identifying sound patterns uttered by the animal when in distress. The invention of the present application is also to be distinguished from the system described in Stein U.S. Pat. No. 5,901,660, which also included a sound sensor attached to an animal for purpose of continuously monitoring the movements and eating activities of the animal.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
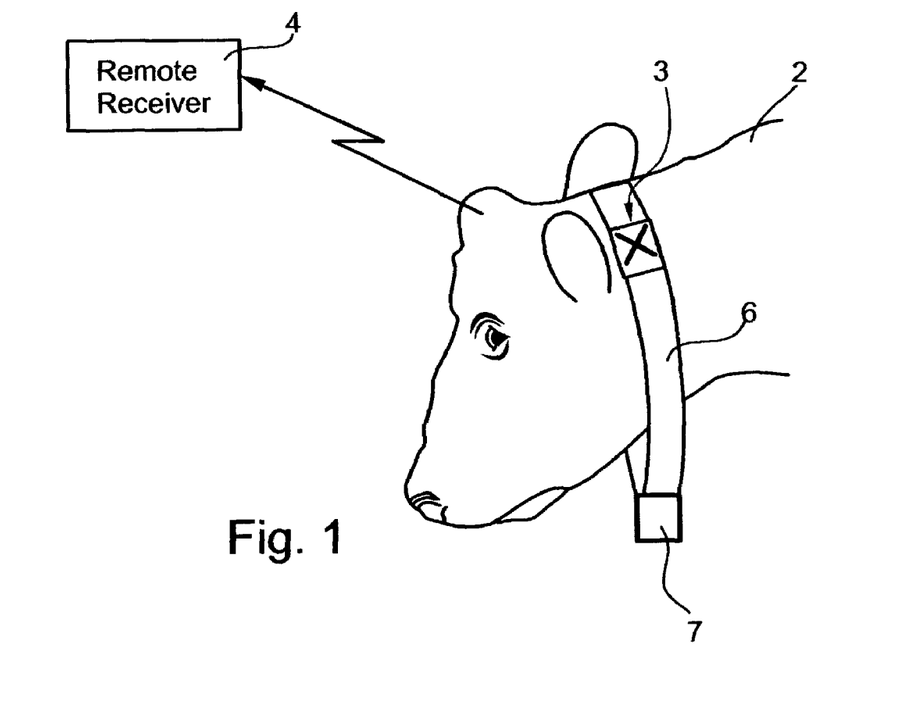
FIG. 1 is a diagram illustrating one form of monitoring system constructed in accordance with the present invention.

With reference to FIG. 1 illustrating a preferred embodiment of the invention, there is shown a cow 2 carrying a sound sensor unit 3 which senses chewing sounds of the cow while feeding on animal feed. Sensor unit 3 converts the sensed chewing sounds to electrical signals and processes them to identify those sensed sounds likely to accompany ruminating activities, as distinguished from eating activities, in a manner to be described more particularly below. As also described below, such identified ruminating activities provide information useful for indicating the physiological condition of the cow, of any desirable changes in its feed for maximizing milk production, and/or of another action that should be taken for maintaining optimum animal health.

The sensor unit 3 further includes a transmitter for transmitting the information processed from the sensed sounds to a remote receiver 4. Such information may be used at the remote receiver for statistical purposes concerning the respective animal or herd, or for taking an action that may be required with respect to changing the animal feed or treating the animal.

Figure 2:
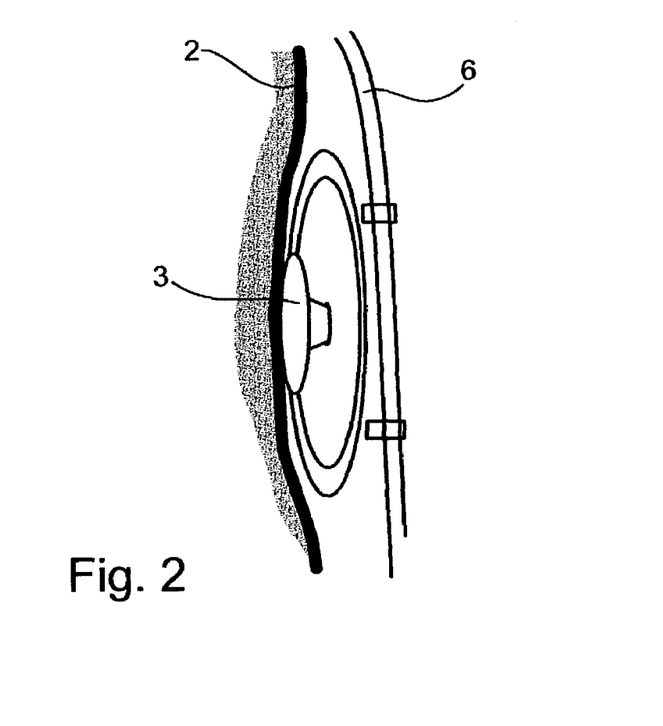
FIG. 2 is a diagram more particularly illustrating the sound sensor unit in the system of FIG. 1.

The sound sensor unit 3 is carried by a neckband 6 applied around the neck of the cow and is located to sense the sounds made by the cow during feeding or grazing. As shown in FIG. 2, the sound sensor unit 3 is carried on the inner face of the neckband 6 so as to be in contact with the skin of the cow. A weight 7 is applied to the lower end of the neckband to tauten it and to press the sensor unit 3 against the skin at the cow's neck. Weight 7 may be the battery engaging the sound sensor unit 3.

Figure 3:
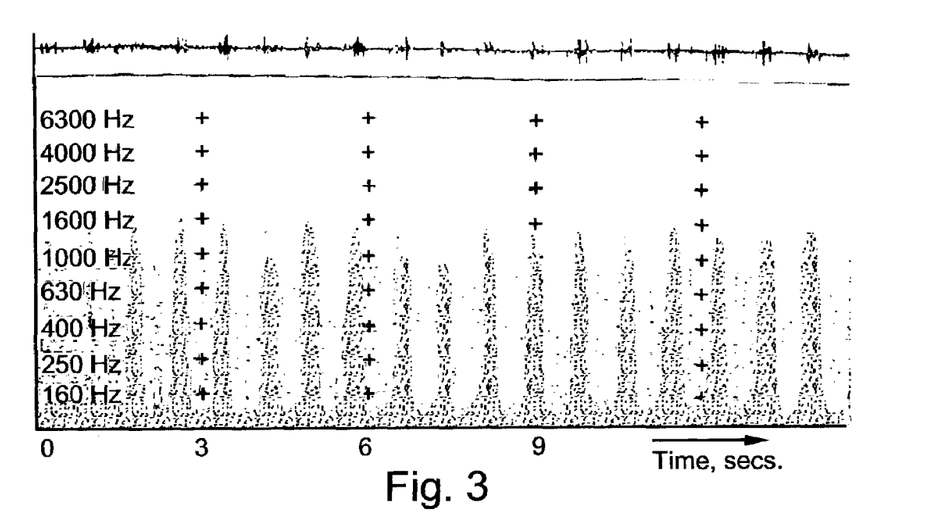
FIG. 3 is a diagram illustrating an example of the electrical output of the sound sensor unit of FIG. 2.

The sound sensor unit 3 may include any known type of sound sensor for sensing chewing sounds made by the cow while feeding and for converting them to electrical signals. For example, the sound sensor could be a diaphragm-type microphone, a piezoelectric device, or any other sound-to-electrical transducer, for sensing chewing sounds produced by the cow when chewing on the animal feed and for converting them to electrical signals as shown in FIG. 3 to be described below.

Figure 4:
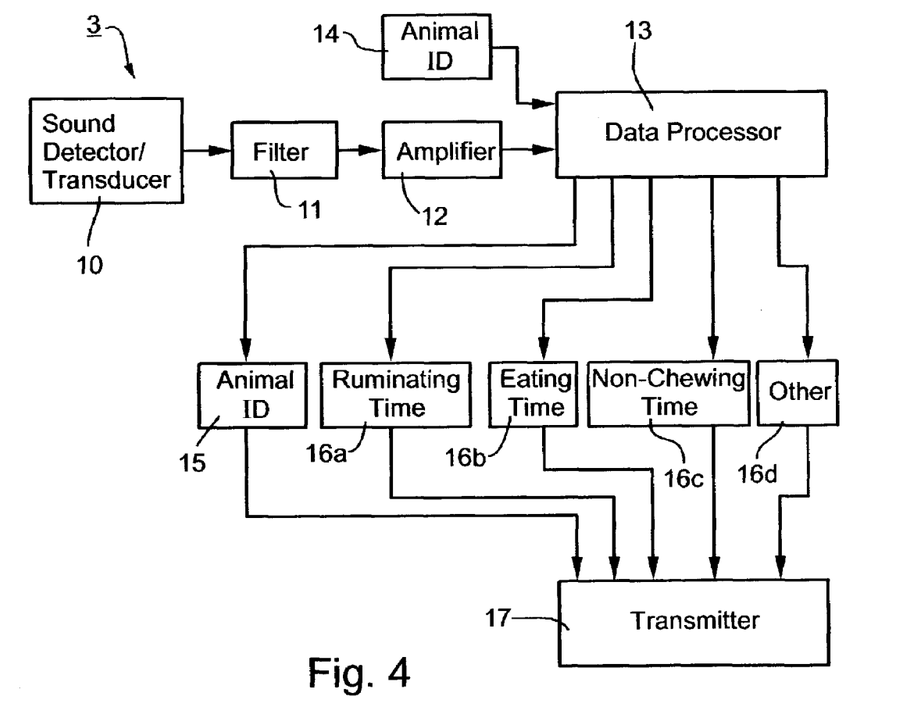
FIG. 4 is a block diagram illustrating the construction of the sound sensor unit in the system of FIG. 1.

FIG. 4 is a block diagram illustrating the construction of the sound sensor unit 3. It includes a sound detector-transducer 10, such as a microphone, piezoelectric device, etc., for converting the picked-up sounds to electrical signals; a filter 11 for passing a predetermined signal bandwidth; an amplifier 12 for amplifying the signal; and a data processor 13 for processing the electrical signals produced by the sound detector-transducer 10. Data processor 13 also includes the animal identification 14, to identify the animal from which this information was derived.

The information received by data processor 13 from the sound detector-transducer 10 may be processed in the manner described below with respect to any one of FIGS. 4-11, to produce outputs including some or all of the following information: the identification of the respective cow at 15; ruminating time at 16a, eating time at 16b, non-chewing time at 16c, and, at 16d, other information including signals or alarms indicating an action that may be immediately required with respect to changing the animal feed, treating the animal, etc. The sensor unit 3 further includes a transmitter 17 which transmits the sensed information to the remote receiver 4 (FIG. 1).

Figure 5:
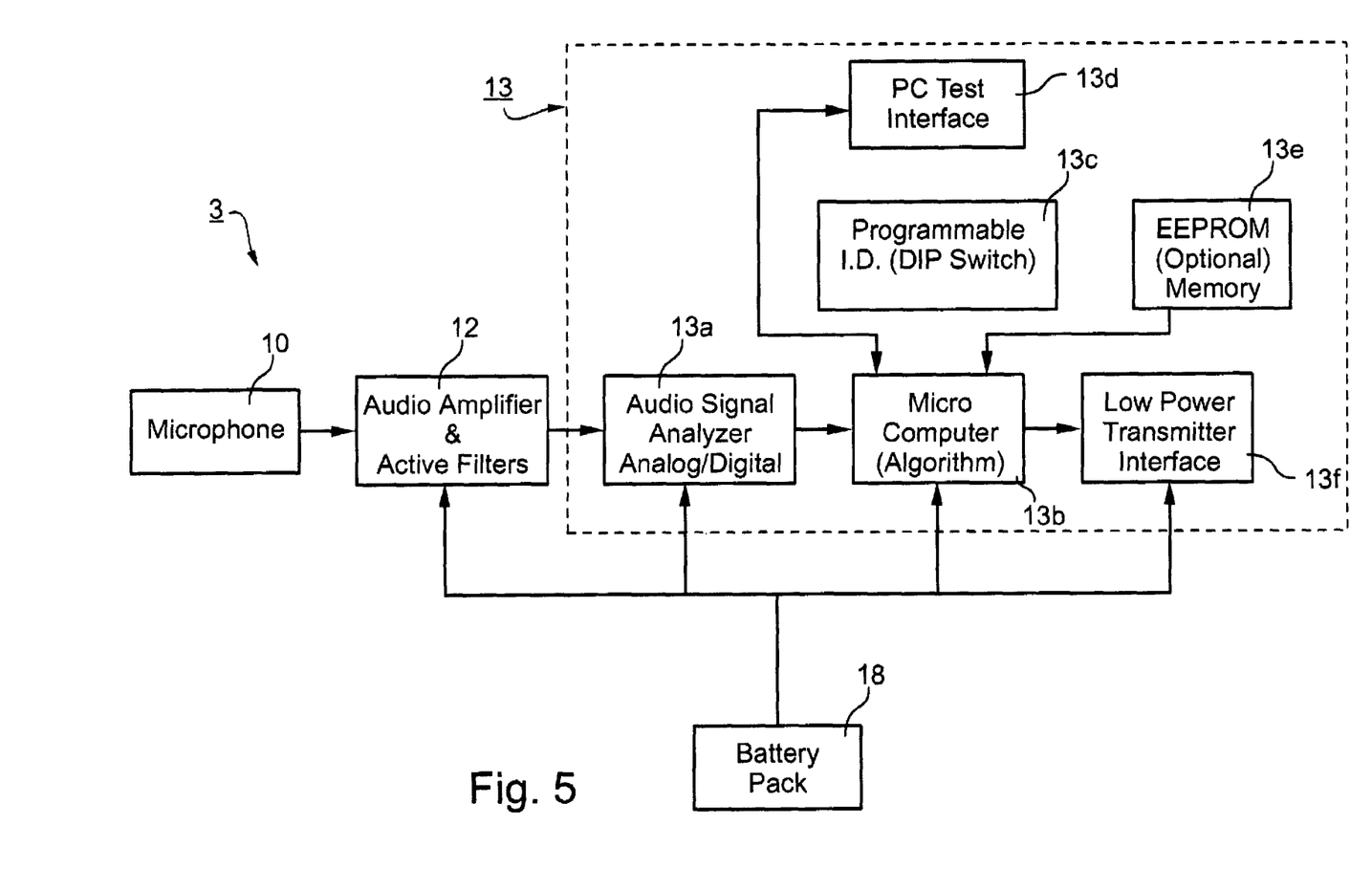
FIG. 5 is a block diagram more particularly illustrating a preferred construction of the sound sensor unit.

FIG. 5 more particularly illustrates the construction of sensor unit 3. It includes a microphone 10 serving as the sound detector-transducer, an amplifier 12 together with the active filters, and the data processor 13. Data processor 13 includes an audio signal analyzer 13a which converts the analog signal to a digital signal; a microcomputer 13b which performs the analysis according to a predetermined algorithm (e.g., one of those described below); a programmable I.D. (dip switch) 13c; a test interface 13d; and an EEPROM optional memory 13e. Data processor 13 further includes a transmitter interface 13f for interfacing with the transmitter 17 (FIG. 4), which transmits the processed information to the remote receiver 4 (FIG. 1). The sensor unit 3 is supplied by a battery supply, as shown at 18 in FIG. 5.

During rumination, cows typically chew in a fairly steady rhythm, with each chew taking about 0.5-1.5 seconds, more particularly 0.70-1.43 seconds, and with swallowing and bolus regurgitations taking place for a period of 2-7 seconds at intervals of about 32-81 seconds. When ruminating, a swallowed bolus will be regurgitated from the rumen back to the mouth usually within 2 seconds after swallowing. On the other hand, when the cow is merely eating, there are no bolus regurgitations, and the chewing actions are much more sporadic, with each chew generally being for a longer or shorter period of time than each chew during rumination.

FIG. 3 illustrates typical electrical signals outputted by the sensor unit 3 while chewing during rumination (as distinguished from eating) and between bolus regurgitations. Thus, as shown in FIG. 3, each chew is represented by a pulse of electrical energy having a frequency of up to 1,000 Hz and having a duration equal to the duration of the chew. A fairly typical example is illustrated in FIG. 3, wherein each chew has a duration of slightly less than 1.0 seconds, such that slightly more than 3 pulses are produced by the chews during each 3 second sample period. Generally speaking, detecting 2-4 pulses within a three second sample period indicates a ruminating activity as distinguished from an eating activity.

It will thus be seen that the sensor unit 3 senses the chewing sounds by the cow and transmits electrical signals, corresponding to those illustrated in FIG. 3, to the remote receiver 4, which receives the transmitted electrical signals and applies them to the data processor 5. Data processor 5 analyzes the received electrical signals to determine whether the chewing actions represented by them are ruminating activities or eating activities.

Figure 6:
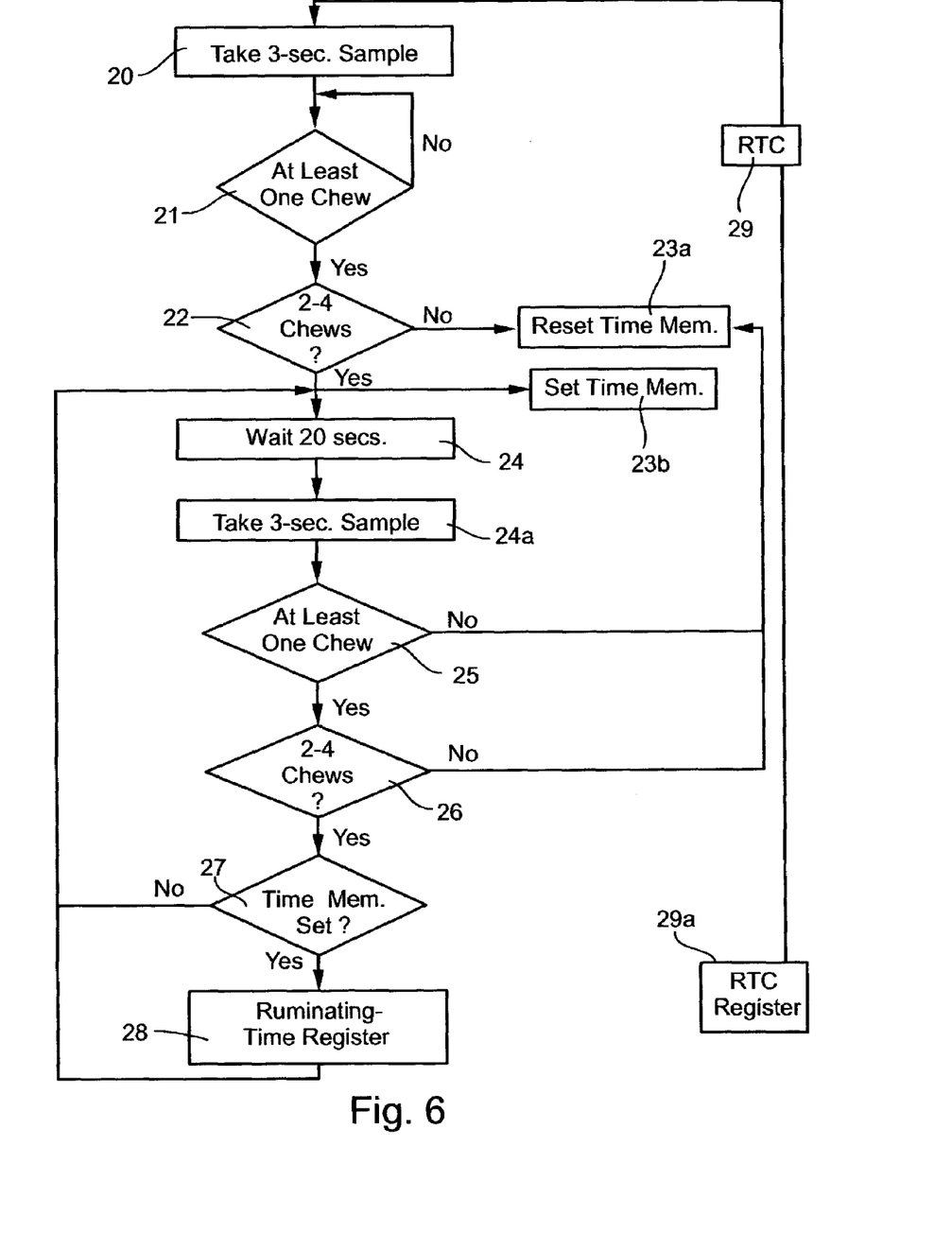
FIG. 6 is a flow chart illustrating the operation of the data processor in the sound sensor unit of FIG. 5 according to one embodiment of the invention wherein chewing actions are detected and analyzed.

FIG. 6 is a flow chart illustrating one algorithm which may be used by the data processor 5 for determining whether the detected chewing sounds represented by the received electrical signals are ruminating activities or eating activities. Briefly, this is done according to the flow chart of FIG. 6 by determining the rhythm (e.g., duration and frequency) of the chewing sounds at time-spaced intervals and comparing the determined rhythm with a predetermined rhythm representing a ruminating activity as distinguished from an eating activity.

More particularly, the rhythm of the chewing actions are determined, according to the algorithm of FIG. 6, by counting the number of chewing sounds in a predetermined sample time period at periodically spaced intervals, comparing the counted number of chewing sounds in each sample time period with the counted number in the immediately preceding sample time period, and determining that the chewing sounds in both sample time periods involve ruminating activities only when the counted number of chewing sounds in two consecutive samples are both within a predetermined range. Preferably, the sample time period is from 1-4 seconds, and the periodically spaced intervals are at least 15 second intervals. In the example illustrated by the flow chart of FIG. 6, the sample time period is 3 seconds, and the periodically spaced intervals are 20 seconds.

A real-time clock (RTC) keeps track of the time period during which the system is in operation (block 29). The time period may be, for example, a 24-hour interval, or any part of such an interval.

During this time interval, a three-second sample time period is examined to see whether at least one chew was detected (blocks 20, 21). If so, a decision is made whether there were two-four chews during the respective sample time period (block 22). If 2-4 chews were not detected, a time memory is reset (block 23a), but if 2-4 chews were detected during the three-second sample period, a ruminating activity is indicated and the time memory is set to measure the times (block 23b). The system then waits for twenty seconds (block 24) and then takes another three-second sample time period (block 24a) to determine whether there were two-four chews during the latter three-second sample time period (blocks 25, 26). If so, and the time memory had been set, the respective time period (26 seconds) is added to the ruminating time register (block 28). On the other hand if the ruminating time register had not been set, it is now set, and the process repeated after another 20-second time period.

It will thus be seen that the data processor produces the following outputs: the ruminating time (block 28) and the total time for the respective period (block 29a).

This information, together with the identification of the respective cow outputted by the data processor at 17 (FIG. 5), can be compared to empirical or reference data applicable with respect to milk production and animal health to provide an indication of the physiological condition of the cow, and/or any changes that may be desirable in its feed for maximizing milk production and/or for maintaining optimum animal health. For example, an excessively low ruminating time may indicate inadequate fiber and/or roughage in the animal feed for maximum milk production and therefore that additional fiber and/or roughage should be added. It may also indicate acidosis in the animal because of insufficient saliva and, therefore, insufficient bicarbonate production, such that a buffering additive should be added in order to optimize the pH of the animal's rumen. On the other hand, an excessive ruminating time might indicate an excess of fiber and/or roughage, which could also decrease milk production because this would limit the intake and digestibility of the animal feed. An excessively low chewing time might also indicate that the animal is no longer suitable for milk production.

Figure 7:
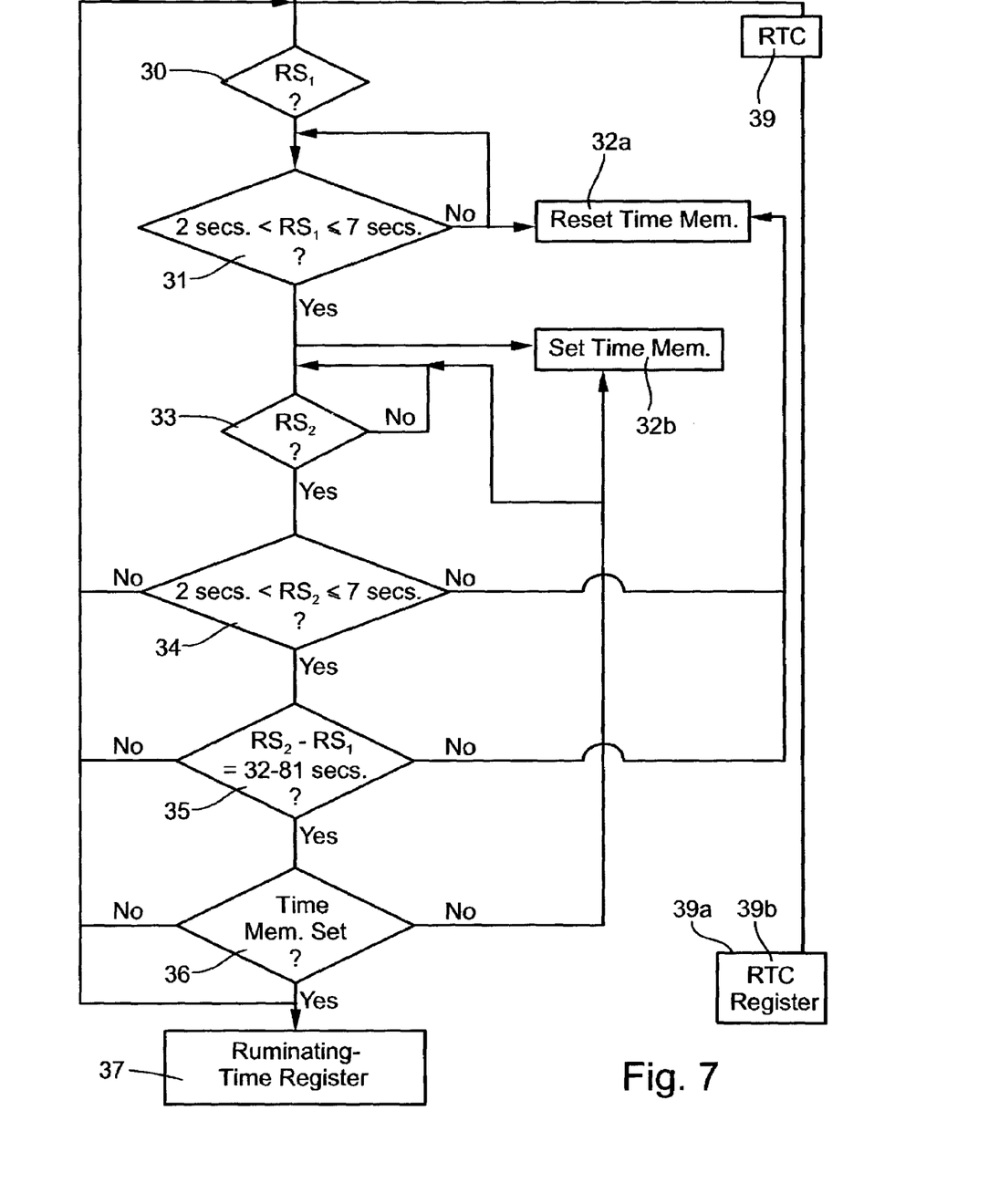
FIG. 7 is a flow chart illustrating the operation of the date processor in the sound sensor unit of FIG. 5 according to a second embodiment of the invention wherein regurgitations are detected and analyzed.

FIG. 7 illustrates another embodiment of the invention wherein the ruminating time is accumulated, not by detecting the chewing sounds and comparing their rhythm with respect to that during rumination, but rather by detecting swallowing and/or bolus regurgitations that occur during rumination and accumulating the respective time periods. As indicated earlier, during rumination a regurgitation usually occurs about two seconds after swallowing, and the total time for both swallowing and bolus regurgitation generally takes about two-seven seconds, and generally occurs every 32-81 seconds. The flowchart of FIG. 7 utilizes this rhythm of regurgitations to determine whether a ruminating activity is involved.

Thus, as shown in the flowchart of FIG. 7, a time memory is reset until a swallowing and bolus regurgitation sound ($RS_1$) is detected and determined to have lasted for a time interval of two-seven seconds (blocks 30, 31) at which time a time memory is set (blocks 32a, 32b) to begin measuring the time. When the next bolus regurgitation sound ($RS_2$) is detected (block 33) and determined to have lasted two-seven seconds (block 34), a determination is made whether the time between the two regurgitations was between 32 and 81 seconds (block 35). If both of the above conditions have been found to have occurred, and the time memory had been set (block 36), the time between $RS_1$ and $RS_2$ is added to the ruminating time register (block 37), and the system returns to the Start to detect the next regurgitation sound ($RS_1$).

If, however, the regurgitation determined in block 33 ($RS_2$) is determined not to have lasted two-seven seconds, or not to have occurred within 32-81 seconds from the previous regurgitation, the time measured in the time memory is not added to the ruminating register, but rather the time memory is reset (block 32a) and the system returns to block 33, and the system again returns to the Start to await for the detection of the next regurgitation. Also, if the detected regurgitation $RS_2$ was found to meet both of the above conditions, but the time memory was not in its set condition (block 36), the time memory is then placed in its set condition to begin the measurement of time from that instant, and the system again returns to its Start condition.

The system further includes a real-time clock (RTC) which measures the total time of operation of the system (block 38), so that the system will indicate in the RTC register (block 39) the total time of operation of the system, and in the ruminating time register (block 37) the time during which a ruminating activity occurred.

Figure 8:
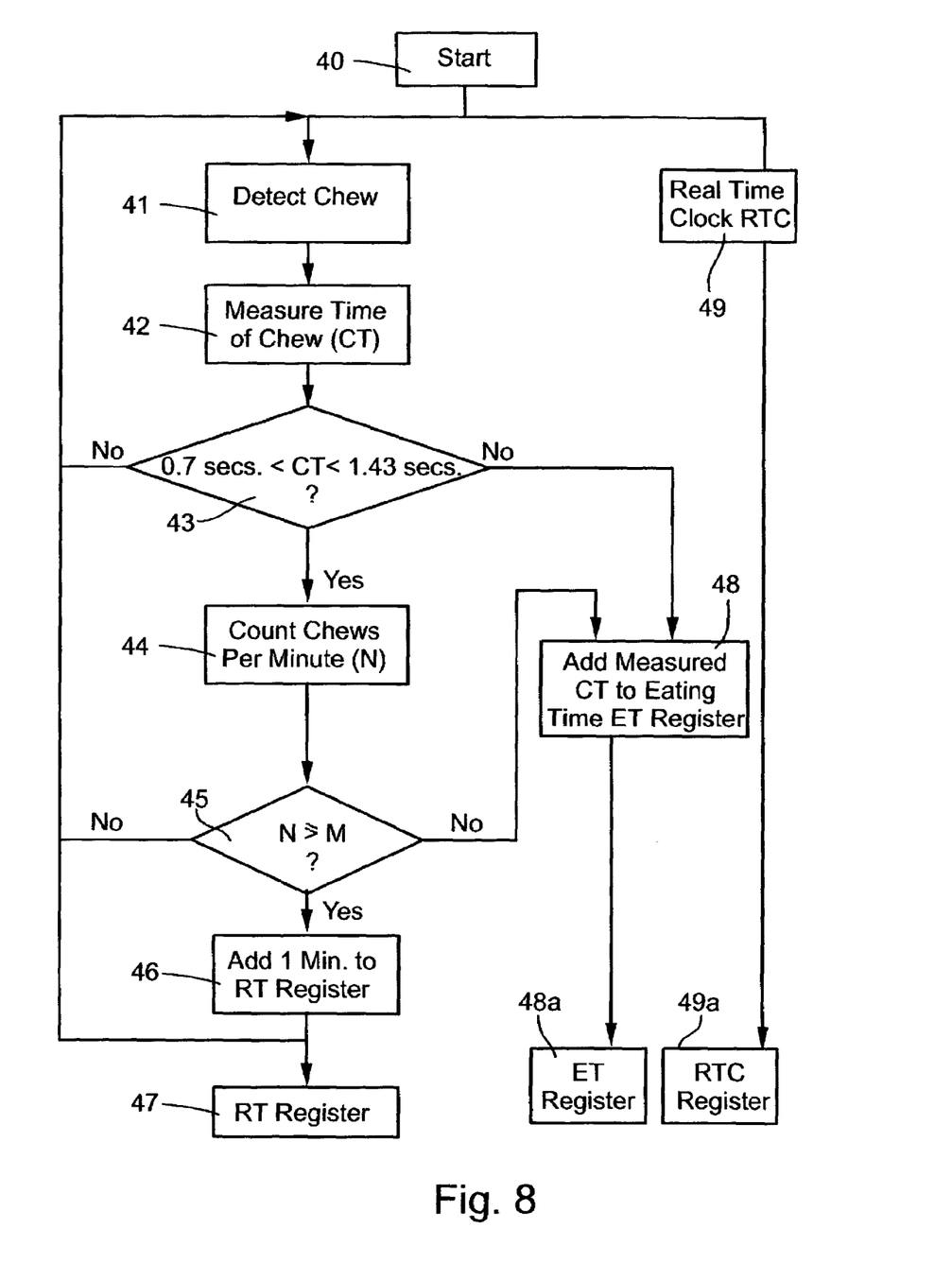
FIG. 8 is a flow chart illustrating the operation of the data processor according to another embodiment of the invention wherein chewing actions are detected and analyzed.

FIG. 8 is a flow chart illustrating another embodiment of the invention wherein chewing actions are detected and analyzed to determine whether they involve a ruminating activity or an eating activity. Thus, as earlier described, chewing actions related to rumination have a defined rhythm of generally 0.50-1.50, more particularly 0.70-1.43, seconds per chew. Therefore, if chewing actions are determined to have this rhythm, it is highly reasonable that the chewing actions are those accompanying rumination rather than non-rumination (eating).

As shown in the flow chart illustrated in FIG. 8, chewing actions are detected, measured and counted during a predetermined period of time, such as one minute (blocks 40-44.). If each chew time (CT) is between 0.7 seconds and 1.43 seconds, and if the counted number (N) is equal to or above a predetermined number (M), this indicates a ruminating activity and the ruminating time register is incremented (blocks 45-47) the one minute. The predetermined number (M) should be over "42", preferably over "45". Thus, for each minute that 45 or more chews per minute are counted, that minute is recorded in the ruminating time register as a ruminating activity.

However, if the chewing time (CT) is either less than 0.7 seconds or more than 1.43 seconds, or if the counted number of chews per unit of time is less than M (e.g., 45), this indicates a non-ruminating activity, and therefore the one minute time is not added to the ruminating-time register 47, but rather to an eating time register (blocks 48, 49).

The system illustrated in FIG. 8 also measures the total time of the respective interval in the real-time clock RTC (block 49), so that the system will provide a measurement of the ruminating time (block 47), the eating time (block 48a), and the total time interval involved (block 49a).

As indicated earlier, during rumination, swallowing and bolus regurgitations typically take place at intervals of about 32-81 seconds, with each swallowing plus regurgitation time lasting about 2-7 seconds. It is therefore possible to identify a ruminating activity by sensing the rhythm of regurgitations of a bolus from the animal's rumen back to the animal's mouth. Regurgitations may be sensed by the sound sensor unit 3 as described above.

Figure 9:
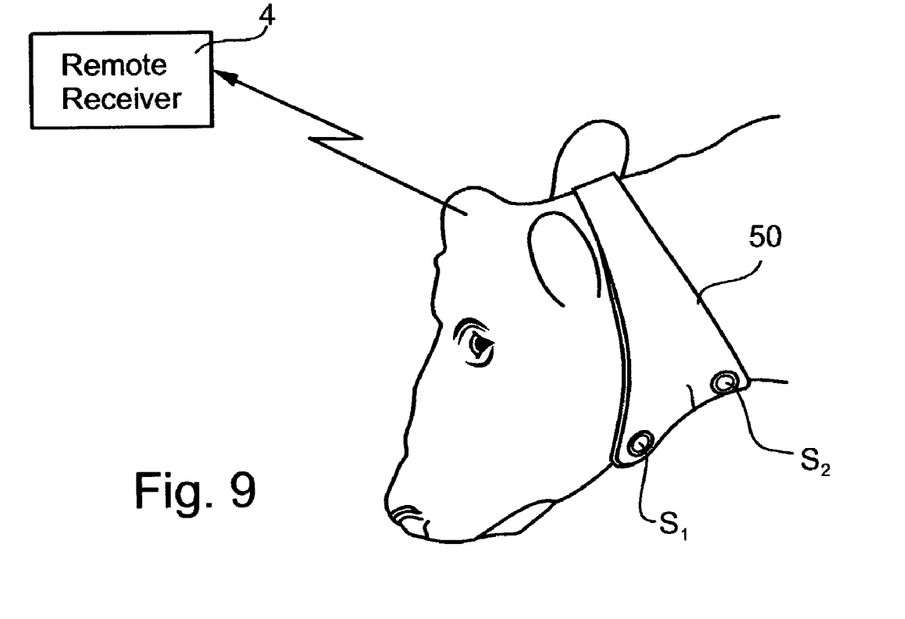
FIG. 9 is a diagram illustrating a monitoring system including two sensors mounted to the throat of the animal for detecting regurgitations.

FIG. 9 illustrates another arrangement for sensing regurgitations of the bolus on order to determine whether the regurgitation rhythm corresponds to that of a ruminating activity.

Thus, as shown in FIG. 9, two bolus sensors $S_1$, $S_2$, are applied to the animal's throat by a band or collar 50. Bolus sensor $S_1$ is located close to the animal's mouth, whereas bolus sensor $S_2$ is spaced a short distance, e.g., about 10 cm, from bolus sensor $S_1$ in the direction of the animal's stomach. Such bolus sensors may be microswitches, for example. A regurgitation of a bolus is indicated when bolus sensor $S_2$ is actuated, and bolus sensor $S_1$ is then actuated within a short predetermined time interval (e.g., a small fraction of a second) thereafter.

Figure 10:
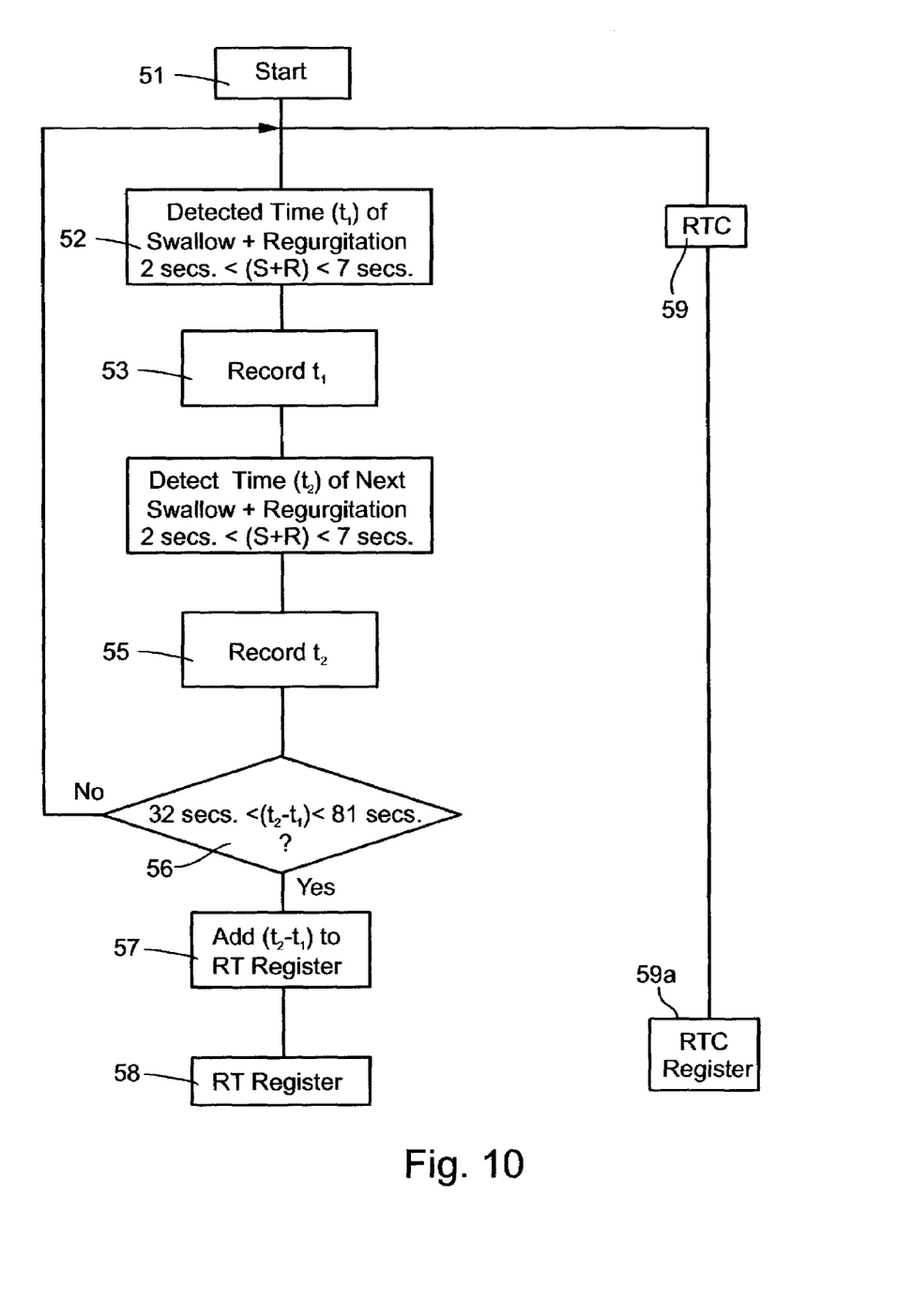
FIG. 10 is a flow chart illustrating the operation of the data processor when regurgitations are detected in accordance with the embodiment of FIG. 9.

FIG. 10 is a flow chart illustrating one manner of programming the data processor for measuring ruminating time in this manner.

When a bolus is swallowed, sensor $S_1$ is actuated and when that bolus is regurgitated, sensor $S_2$ is actuated and then a short time thereafter (a small fraction of a second), sensor $S_1$ is again actuated. In this manner, the symptom can measure the time taken to swallow a bolus and the regurgitation of that bolus, and when this time is measured to be between two seconds and seven seconds, this indicates a ruminating activity and records that time (blocks 52, 53). The next time a swallow plus regurgitation is found to take between two seconds and seven seconds, that time ($t_2$) is also recorded (blocks 54, 55). The system then checks to see whether $t_2$-$t_1$ is between 32 and 81 seconds, and if so, this indicates that the two regurgitations were involved in a ruminating activity, and therefore the interval between time $t_2$-$t_1$ is added to the ruminating time register (blocks 57, 58).

The system illustrated in FIG. 10 also includes a real-time clock (block 59), and a real-time clock register (block 59a) for displaying the period of time involved in the operation of the system.

Figure 11:
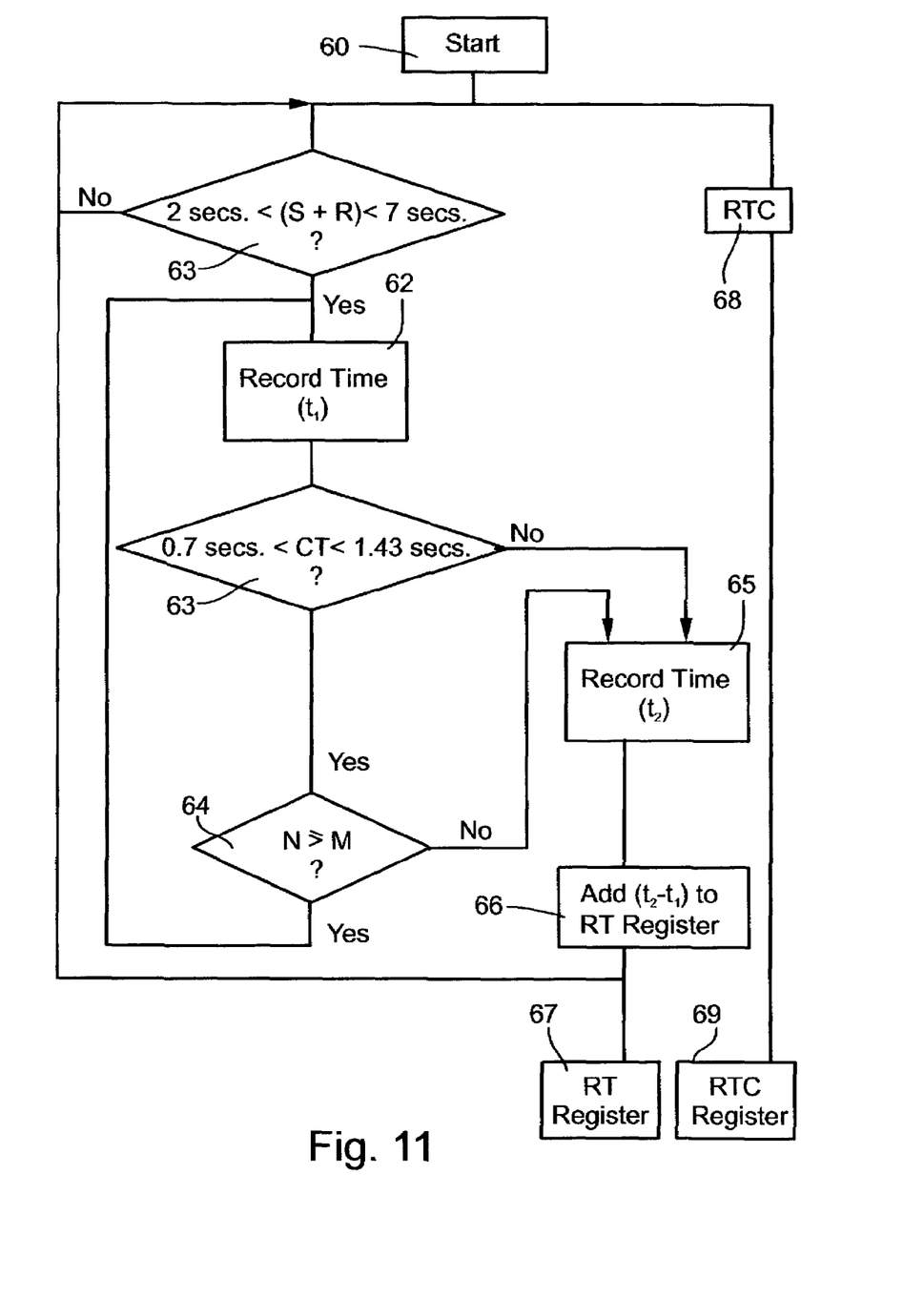
FIG. 11 is a flowchart illustrating the operation when both regurgitations and chewing actions are detected and analyzed.

The flowchart illustrated in FIG. 11 utilizes both the chewing rhythm of FIG. 8 and the regurgitation rhythm of FIG. 10 for measuring the ruminating time. Thus, as shown in FIG. 11, as soon as a regurgitation is detected indicating a ruminating activity (blocks 60, 61) the time ($t_1$) is recorded (block 62). Then the chewing rhythm is monitored. So long as the duration of each chew, and the frequency of the chews, are both characteristic of a ruminating action as described above and as shown by blocks 63, 64 respectively, the time is added to the ruminating register (blocks 65-67).

The system illustrated by the flowchart of FIG. 11 also includes a real-time clock RTC (block 68), which keeps track of the total time of operation of the system, so that the system outputs the total time of operation (block 68) and the ruminating time (block 67).

It will thus be seen that the invention enables ruminant animals in general, and dairy cattle in particular, to be monitored individually, or as part of a herd, in an efficient and convenient manner to provide an indication of the physiological condition of each animal, and also an indication of any desirable change in the animal feed for maximizing milk production and/or for optimizing animal health. The system can also be programmed to provide an alarm or other signal if a particular action is immediately required. For example, if the sensor senses no chewing actions within a predetermined time interval, e.g., for two or three hours, this may indicate that the animal is ill and requires immediate treatment.

It has been found particularly advantageous to sense both the chewing actions and the regurgitations by a sound sensor, as described above. However, it is also contemplated that the chewing actions may be sensed in another manner, e.g., by sensing the tightening of the muscles in the animal's neck during chewing or swallowing, or the movement of the animal's jaw during chewing, and that the regurgitations may also be sensed in other manners, e.g. by the use of microswitches as described above with respect to FIGS. 9 and 10.

While the invention has been described with respect to several preferred embodiments, it will be appreciated that these are set forth merely for purposes of example, and that many other variations, may be made. For example, in addition to the use of other sensors for detecting chewing actions or regurgitations as indicated above, other algorithms may be used for identifying ruminating activities from the detected actions. Other variations, modifications and applications of the invention will be apparent.

What is claimed is:

1. A monitoring system for monitoring the suitability of animal feed, of ruminant animals, comprising:
   at least one sensor for sensing chewing actions of the animal produced by the animal while chewing animal feed, including the time of each chewing action and the number of chewing actions per predetermined time interval, for indicating a ruminating activity;
   and a data processor accumulating both the time of each of said sensed chewing actions and the number of said chewing actions per unit time interval, for determining the chewing rhythm of the animal indicating ruminating activities over a predetermined time period to provide an indication of desirable changes in the animal feed for maximizing milk production or for maintaining animal health.

2. The monitoring system according to claim 1, wherein said at least one sensor is a sound sensor carried by the animal for sensing chewing sounds of the animal.

3. The monitoring system according to claim 2, wherein said sound sensor is carried by a band around the animal's neck, which band also includes a battery which also serves as a weight for pressing said sound sensor against the animal's neck.

4. The monitoring system according to claim 1, wherein said at least one sensor is a bolus sensor which senses regurgitations of a bolus from the animal's rumen to the animal's mouth.

5. The monitoring system according to claim 4, wherein there are two bolus sensors, one bolus sensor being carried at the animal's throat close to the mouth, and a second bolus sensor being carried at the animal's throat spaced from said one bolus sensor a predetermined distance in the direction of the animal's stomach, said data processor determining that a regurgitation occurs when said one bolus sensor senses a bolus within a short predetermined time interval after said second bolus sensor senses a bolus.

6. The monitoring system according to claim 5, wherein said bolus sensors are microswitches.

7. The monitoring system according to claim 4, wherein said data processor determined that the sensed regurgitations are those of a ruminating activity when the time period for a swallow and a regurgitation is within a predetermined known range indicating a ruminating activity, and when the intervals between regurgitations are also within a predetermined known range indicating a ruminating activity.

8. The monitoring system according to claim 1, wherein said at least one sensor includes a transmitter for transmitting information regarding said sensed actions of the animal indicating a ruminating activity, and a receiver at a remote location for receiving said transmitted information.

9. The monitoring system according to claim 8, wherein said receiver at the remote location also includes an alarm which is actuated when the sensed actions indicate the existence of a condition requiring immediate action.

* * * * *